(12) United States Patent
Evans et al.

(10) Patent No.: US 7,725,457 B2
(45) Date of Patent: May 25, 2010

(54) STRUCTURED QUERY LANGUAGE TABLE MERGING

(75) Inventors: Christopher Evans, Bristol (GB); Paolo Fragapane, Bristol (GB); Stephen Cave, Gloucester (GB); Andrew Osborn, Bristol (GB)

(73) Assignee: Oracle International Corporation, Redwood Shores, CA (US)

( * ) Notice: Subject to any disclaimer, the term of this patent is extended or adjusted under 35 U.S.C. 154(b) by 258 days.

(21) Appl. No.: 10/739,338

(22) Filed: Dec. 19, 2003

(65) Prior Publication Data

US 2005/0076007 A1 Apr. 7, 2005

(30) Foreign Application Priority Data

Oct. 3, 2003 (GB) ................. 0323216.2

(51) Int. Cl.
*G06F 7/00* (2006.01)
*G06F 17/30* (2006.01)

(52) U.S. Cl. ..................... 707/714; 707/717
(58) Field of Classification Search ............... 707/1–10
See application file for complete search history.

(56) References Cited

U.S. PATENT DOCUMENTS

| | | | | |
|---|---|---|---|---|
| 5,367,675 A | * | 11/1994 | Cheng et al. ............. | 707/2 |
| 5,548,754 A | | 8/1996 | Pirahesh et al. | |
| 5,822,750 A | | 10/1998 | Jou et al. | |
| 5,963,933 A | * | 10/1999 | Cheng et al. ............. | 707/2 |
| 6,199,063 B1 | * | 3/2001 | Colby et al. ............. | 707/4 |
| 6,334,128 B1 | * | 12/2001 | Norcott et al. ........... | 707/5 |
| 6,341,281 B1 | * | 1/2002 | MacNicol et al. ......... | 707/3 |
| 7,107,255 B2 | * | 9/2006 | Kiernan et al. ........... | 707/2 |
| 2003/0009450 A1 | | 1/2003 | Kiernan et al. | |
| 2003/0167258 A1 | * | 9/2003 | Koo et al. ................ | 707/2 |

OTHER PUBLICATIONS

Oracle9i SQL Reference, Jun. 2001.*
A Rule Engine for Query Transformation in Starburst and IBM DB2 C/S DBMS; Hamid Pirahesh, T.Y. Cliff Leung, Waqar Hasan; IBM Almaden Research Center; 1997, IEEE.
*Elimination of Views and Redundant Variables in an SQL-like Database Language for Extended $NF^2$ Structures*; Norbert Sildkamp, Volker Linnermann; IBM Scientific Centr Heidelberg, Tiergartenstr, 15, West Germany.
"Removing Redundant Join Operations in Queries Involving Views"; Nikolaus Orr and Klaus Horlander; IBM Germany, Heidelbert Sceintifict Centre, recv'd Jun. 24, 1984; revised form Nov. 16, 1984).

(Continued)

*Primary Examiner*—Hosain T Alam
*Assistant Examiner*—Shew-Fen Lin
(74) *Attorney, Agent, or Firm*—Hanify & King, P.C.

(57) ABSTRACT

A method of modifying a Structured Query Language (SQL) statement in order to reduce the number of joins executed by a database is disclosed. The method includes presenting the SQL statement to the database and identifying joins in the SQL statement for removal in accordance with one or more predetermined criteria. For each identified join, the SQL statement may be modified so as to remove the identified join and to change references to a first instance of a table which is referred to by the identified join to a second instance of the table.

5 Claims, 2 Drawing Sheets

Figure 2:
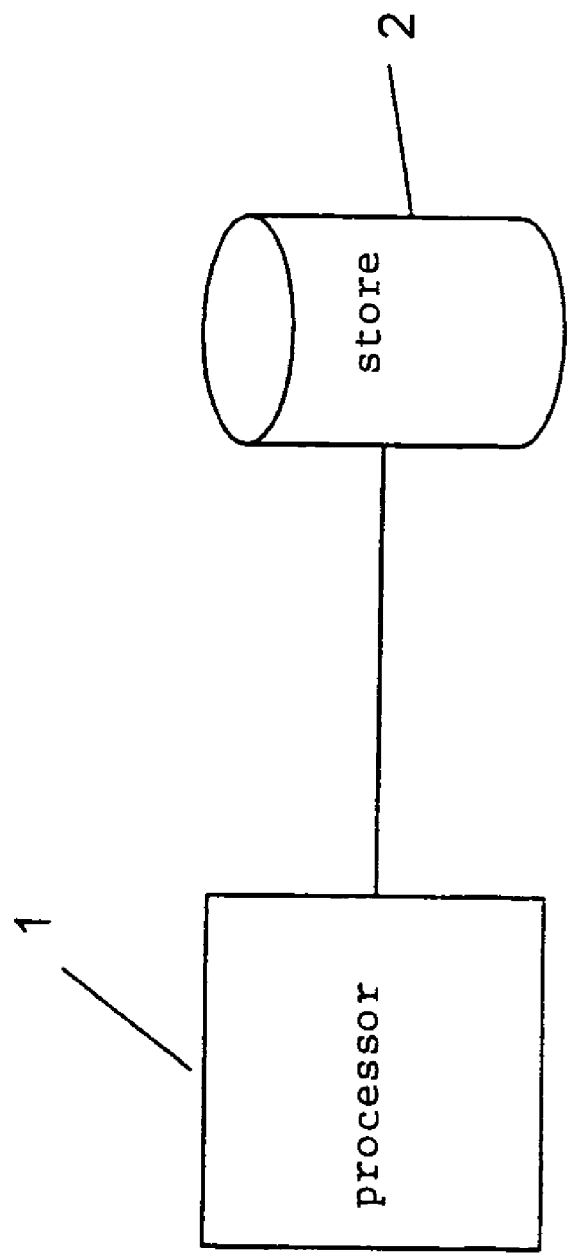

| EMP | |
|---|---|
| ENAME | DEPTNO |
| SMITH | 10 |
| JONES | 20 |
| COOPER | 30 |
| MILLER | 10 |
| --- | -- |

| DEPT | | |
|---|---|---|
| DEPTNO | DNAME | LOC |
| 10 | R&D | LONDON |
| 20 | SALES | LONDON |
| 30 | ACCOUNTS | LEEDS |
| -- | --- | --- |

OTHER PUBLICATIONS

"Querying Multiple Features of Groups in Relational Databases" Damianos Chatziantoniou & Kenneth A. Ross, 1996, VLDB'96, Proceedings of 22th Int'l Conf. on Very Large Data Bases, p. 295-306 ISBN:1-55860-382-4.

"Performance Tuning SQL Server Joins", 2000-2003, Available from http://www.sql-server-performance.com/tuning_joins.asp [Jan. 20, 2004].

* cited by examiner

| EMP ||
|---|---|
| ENAME | DEPTNO |
| SMITH | 10 |
| JONES | 20 |
| COOPER | 30 |
| MILLER | 10 |
| --- | -- |

| DEPT |||
|---|---|---|
| DEPTNO | DNAME | LOC |
| 10 | R&D | LONDON |
| 20 | SALES | LONDON |
| 30 | ACCOUNTS | LEEDS |
| -- | --- | --- |

FIGURE 1

STRUCTURED QUERY LANGUAGE TABLE MERGING

This invention relates to a method of modifying a structured query language (SQL) statement in order to reduce the number of joins executed by a database to which the SQL statement is presented.

Joins are a well known database construct used for selecting data from more than one table. Typically, the rows from these tables are paired using a specified join condition and the resulting rows are returned by the database. However, they are fairly complicated for most users of a database to understand and hence, it is common practice to hide joins from users. This may be accomplished in several ways, for example using a database view or a Discoverer® complex folder, thereby presenting a user with data that is already joined. Such a view may also hide complexity in the base tables used to form the view. For example, the base tables may have a large number of columns and the view may then only expose those columns more frequently referred to.

The problem arises when a user presents an SQL statement to the database which retrieves data from the view and also from one of the columns of one of the base tables that the view does not expose. Such an SQL statement must join the view to the base table in order to retrieve data from the column. The processing of this additional join will slow down the execution of the SQL statement considerably.

In accordance with one aspect of the present invention, there is provided a method of modifying a Structured Query Language (SQL) statement in order to reduce the number of joins executed by a database, the method comprising:
   a. presenting the SQL statement to the database;
   b. identifying joins in the SQL statement for removal in accordance with one or more predetermined criteria; and
   c. for each identified join, modifying the SQL statement so as to remove the identified join and to change references to a first instance of a table which is referred to by the identified join to a second instance of the table.

In accordance with a second aspect of the invention, there is provided a database system comprising a store in which at least one table is stored, and a processor adapted to:
   a) receive an SQL statement;
   b) identify joins in the SQL statement for removal in accordance with one or more predetermined criteria;
   c) for each identified join, modify the SQL statement so as to remove the identified join and to change references to a first instance of one of the tables in the store which is referred to by the identified join to a second instance of the table; and
   d) execute the modified SQL statement in order to retrieve desired data from the at least one table.

The invention exploits the fact that a join from a view to one of its base tables is superfluous, being effectively a join from the base table back to itself, and by removing the join from the SQL statement improves the efficiency of execution of the statement.

In a first embodiment, the one or more predetermined criteria are that the join condition of the retrieved join is an equality between unique keys having no null values in the table. Typically, the unique keys having no null values are primary keys.

In another embodiment, the one or more predetermined criteria are that the join condition is a simple equality between any column in the two instances of the table and that the join is mergeable.

In this case, the join is typically considered to be mergeable if a flag associated with the join is set by a user.

In a third aspect of the invention, there is provided a method for retrieving desired data from a database system, the method comprising:
   a) rewriting a SQL statement using a method according to the first aspect of the invention; and
   b) executing the rewritten SQL statement in order to retrieve the desired data.

In accordance with a fourth aspect of the invention, there is provided a computer program comprising computer program code means adapted to perform the steps of either of the first or third aspects of the invention when said program is used on a computer.

In accordance with a fifth aspect of the invention, there is provided a computer program product comprising program code means stored on a computer readable medium for performing the method according to either of the first or third aspects of the invention when said program product is run on a computer.

An embodiment of the invention will now be described with reference to the accompanying drawings, in which:

FIG. 1 shows two tables in a database and some of the data stored in those tables; and, FIG. 2 shows apparatus on which a database system according to the invention can be operated.

FIG. 1 shows two base tables named EMP and DEPT. Some of the data contained within the table are also shown. The table EMP has two columns named ENAME and DEPTNO and these represent the names of employees and the department number of the department for which they work respectively. The table DEPT has three columns, namely DEPTNO, DNAME and LOC and these represent the department numbers for each department of a business, the names of each department and each department's geographical location respectively. As can be seen, each employee listed in the table EMP is allocated a value of DEPTNO and each of these values is listed in the table DEPT in which they are related to a respective department name and geographical location. As such, a user wishing to know the values of ENAME and DNAME for each employee would join the two base tables EMP and DEPT using the two DEPTNO columns.

In fact, for the convenience of the users, this may be done by creating a database view in order to hide the join. For example, the view may be defined as:

CREATE VIEW EMPDEPT AS
   SELECT ENAME, DNAME, DEPT.DEPTNO FROM EMP, DEPT
   WHERE EMP.DEPTNO=DEPT.DEPTNO

The desired data may then be retrieved from this view using the following SQL statement:

SELECT ENAME, DNAME FROM EMPDEPT

The database column EMP.DEPTNO is a foreign key referring to the database column DEPT.DEPTNO which is a primary key of the DEPT table.

In this example, the column LOC in the DEPT table is not exposed by the EMPDEPT view. Therefore, if a user wishes to retrieve the names of every employee along with their respective department name and geographical location using the EMPDEPT view then they would need to join the DEPT base table to the view with an SQL statement as shown below:

SELECT ENAME, LOC FROM EMPDEPT, DEPT
   WHERE EMPDEPT.DEPTNO=DEPT.DEPTNO

When presented to the database, the definition of the EMPDEPT view will be expanded so that the SQL statement actually executed by the database becomes:

SELECT ENAME, D2.LOC FROM EMP, DEPT D1,
   DEPT D2
WHERE EMP.DEPTNO=D1.DEPTNO
AND D1.DEPTNO=D2.DEPTNO

It can be seen from the above SQL statement that there is a join from the DEPT base table back to itself since the "WHERE" clause requires that "D1.DEPTNO=D2.DEPTNO". Both D1 and D2 are aliases for the DEPT table and therefore represent instances of the same table.

Before this superfluous join can be removed, it is advantageous to ascertain whether the two instances of DEPT can be merged into one without affecting the result set. The database performs this by examining the properties of the DEPT-.DEPTNO column. Since this column is a primary key, the database knows that the values are unique and do not contain nulls. This means that every row retrieved from DEPT for the D1 alias is exactly the same row retrieved from DEPT for the D2 alias. Hence, the two aliases can be merged into one without affecting the result set.

Alternatively, if the software for modifying the SQL statement in order to reduce the number of joins is part of a tool such as Discoverer® which operates as a user interface to the database and which cannot access the primary key information, then the software ascertains whether the two DEPT aliases can be merged by confirming that the join condition is a simple equality between a column in the two instances of the table and that the join is mergable. The join is considered to be mergeable if a user settable metadata property is set. This metadata property acts as a flag and indicates that the associated join is a suitable candidate for table merging.

Aside from removing the join, it is necessary in both cases to change all references in the SQL statement from one alias to the other. In other words, all references to D1 must be changed to D2 or vice versa. For example, if the references to the D1 alias are changed to references to the D2 alias then the SQL statement becomes:

SELECT ENAME, D1.LOC FROM EMP, DEPT D1
WHERE EMP.DEPTNO=D1.DEPTNO

In actual fact, in this example, since there are only two aliases to table DEPT, both D1 and D2 can be changed to refer to DEPT. The resulting SQL statement becomes:

SELECT ENAME, LOC FROM EMP, DEPT
WHERE EMP.DEPTNO=DEPT.DEPTNO

Clearly, the invention does not just find utility when a view is joined to one of its base tables. It may be used whenever a join exists which links a table to itself and where the references to the base table in the SQL statement can be merged into one without affecting the result set.

The invention therefore provides a method whereby users can make free use of joins without performance concerns since any superfluous joins from a table back to itself, for example from a view to one of its base tables, will be removed thereby ensuring the efficiency of execution of the SQL statement.

FIG. 2 shows a database system comprising a processor 1 connected to a store 2. The database system may be connected to a network of computers, for example by a local area network (LAN) or wide area network (WAN).

The database tables shown in FIG. 1 may be stored in the store 2 and the data may be retrieved by executing a suitable SQL statement on processor 1. Indeed, processor 1 may be adapted to receive an SQL statement, either by manual input or via a network connection. The processor 1 may then perform a method as already described with reference to FIG. 1 in order to identify and remove superfluous joins and then execute the modified SQL statement in order to retrieve desired data from the store.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

We claim:

1. A method of modifying a Structured Query Language (SQL) statement in order to reduce the number of joins executed by a database, the method comprising:
   a) presenting the SQL statement to the database;
   b) identifying removable joins between a view and one of its base tables in the SQL statement, wherein the view and the one of its base tables are included in the FROM clause of the SQL statement, wherein a join is removable when a join condition is an equality between unique keys having no NULL values in the one of its base tables;
   c) when primary key information is not accessible, identifying removable joins in the SQL statement based on following criteria:
      (i) the join condition is a simple equality between any column in the two instances of a table; and
      (ii) the join is mergeable, wherein the join is mergeable if a user settable metadata property is set to indicate that the join is a candidate for table merging;
   d) for each identified join, modifying the SQL statement so as to remove the identified join and to change references to a first instance of the one of its base tables which is referred to by the identified join to a second instance of the one of its base tables.

2. The method according to claim 1, wherein the unique keys having no NULL values are primary keys.

3. A method for retrieving desired data from a database system, the method comprising:
   a) rewriting an SQL statement by performing the following steps:
   b) presenting the SQL statement to the database;
   c) identifying removable joins between a view and one of its base tables in the SQL statement, wherein the view and the one of its base tables are included in the FROM clause of the SQL statement, wherein a join is removable when a join condition is an equality between unique keys having no NULL values in the one of its base tables;
   d) when primary key information is not accessible, identifying removable joins in the SQL statement based on following criteria:
      (i) the join condition is a simple equality between any column in the two instances of a table; and
      (ii) the join is mergeable, wherein a join is mergeable if a user settable metadata property is set to indicate that the join is a candidate for table merging;
   e) for each identified join, modifying the SQL statement so as to remove the identified join and to change references to a first instance of the one of its base tables which is referred to by the identified join to a second instance of the one of its base tables; and
   f) executing the rewritten SQL statement in order to retrieve the desired data.

4. A computer program product comprising program codes stored on a computer recordable storage medium for performing the steps of:
   a) presenting the SQL statement to the database;
   b) identifying removable joins between a view and one of its base tables in the SQL statement, wherein the view and the one of its base tables are included in the FROM clause of the SQL statement, wherein a join is removable when a join condition is an equality between unique keys having no NULL values in the one of its base tables;
   c) when primary keg information is not accessible, identifying removable joins in the SQL statement based on following criteria:
      (i) the join condition is a simple equality between any column in the two instances of a table; and
      (ii) the join is mergeable, wherein a join is mergeable if a user settable metadata property is set to indicate that the join is a candidate for table merging;
   d) for each identified join, modifying the SQL statement so as to remove the identified join and to change references to a first instance of the one of its base tables which is referred to by the identified join to a second instance of the one of its base tables.

5. A database system comprising a store in which at least one table is stored, and a processor configured to:
   a) receive an SQL statement;
   b) identify removable joins between a view and one of its base tables in the SQL statement, wherein the view and the one of its base tables are included in the FROM clause of the SQL statement, wherein a join is removable when a join condition is an equality between unique keys having no null values in the one of its base tables;
   c) when primary key information is not accessible, identifying removable joins in the SQL statement based on following criteria:
      (i) the join condition is a simple equality between any column in the two instances of a table; and
      (ii) the join is mergeable, wherein a join is mergeable if a user settable metadata property is set to indicate that the join is a candidate for table merging;
   d) for each identified join, modify the SQL statement so as to remove the identified join and to change references to a first instance of the one of its base tables in the store which is referred to by the identified join to a second instance of the one of its base tables; and
   e) execute the modified SQL statement in order to retrieve desired data from the at least one table.

* * * * *

UNITED STATES PATENT AND TRADEMARK OFFICE
CERTIFICATE OF CORRECTION

| | | |
|---|---|---|
| PATENT NO. | : 7,725,457 B2 | Page 1 of 1 |
| APPLICATION NO. | : 10/739338 | |
| DATED | : May 25, 2010 | |
| INVENTOR(S) | : Christopher Evans et al. | |

It is certified that error appears in the above-identified patent and that said Letters Patent is hereby corrected as shown below:

On the title page, item (56), in column 2, under "Other Publications", line 7, delete "Linnermann;" and insert -- Linnemann; --, therefor.

On the title page, item (56), in column 2, under "Other Publications", line 7, delete "Centr" and insert -- Centre --, therefor.

On the title page, item (56), in column 2, under "Other Publications", line 10-11, delete "Heidelbert Sceintifict" and insert -- Heidelberg Scientific --, therefor.

In column 5, line 11, in claim 4, delete "keg" and insert -- key --, therefor.

In column 6, line 7, in claim 5, delete "null" and insert -- NULL --, therefor.

Signed and Sealed this
Second Day of August, 2011

David J. Kappos
*Director of the United States Patent and Trademark Office*